United States Patent [19]

Willson, III et al.

[11] Patent Number: 4,678,583

[45] Date of Patent: Jul. 7, 1987

[54] USE OF HYDRATES FOR AQUEOUS SOLUTION TREATMENT

[75] Inventors: Richard C. Willson, III, Cambridge, Mass.; Eric Bulot, Nesle, France; Charles L. Cooney, Brookline, Mass.

[73] Assignee: Massachusetts Institute of Technology, Cambridge, Mass.

[21] Appl. No.: 873,364

[22] Filed: Jun. 12, 1986

[51] Int. Cl.$^4$ ............................................. B01D 17/00
[52] U.S. Cl. .................................... 210/638; 210/663; 210/692; 210/737; 260/396 R; 530/351; 530/364; 530/387; 544/274; 548/457; 549/408; 560/174; 562/600; 562/606; 562/608; 564/213; 568/411; 568/824; 568/918
[58] Field of Search ............... 210/634, 638, 639, 642, 210/663–669, 691, 692, 711, 737; 260/396 R; 530/351, 364, 387; 544/274; 548/457; 549/408; 560/174; 562/600, 606, 608; 564/213; 568/824, 913, 917, 918, 411

[56] References Cited

U.S. PATENT DOCUMENTS

| | | | |
|---|---|---|---|
| 2,904,511 | 9/1959 | Donath | 210/711 |
| 3,415,747 | 12/1968 | Glew | 210/737 |
| 4,207,351 | 6/1980 | Davies | 210/737 |
| 4,253,948 | 3/1981 | Hardman | 210/642 |
| 4,515,695 | 5/1985 | Knupp | 210/634 |

*Primary Examiner*—Ivars Cintins
*Attorney, Agent, or Firm*—Paul J. Cook

[57] ABSTRACT

A process for forming a purified solute from an aqueous solution is provided whereby a mixture of an extractant, a hydrate former and the aqueous solution is first formed. The hydrate former forms a hydrate with water while the solute does not form a hydrate. The extractant takes up the solute from the aqueous solution. The mixture is subjected to a temperature and pressure sufficient to form the solid hydrate of the hydrate former, an aqueous solution of the solute and a portion comprising the extractant containing the solute. The solute is recovered from the portion comprising the extractant and the solute.

35 Claims, No Drawings

USE OF HYDRATES FOR AQUEOUS SOLUTION TREATMENT

The Government has rights in this invention pursuant to Contract Number CPE-8318494 awarded by the National Science Foundation.

BACKGROUND OF THE INVENTION

The present invention relates to the purification of materials utilizing hydrate formation.

Hydrates are a group of molecular complexes sometimes referred to as clathrates or clathrate compounds. A wide variety of organic compounds are known to form such complexes. They are characterized by a phenomenon in which "two or more components are associated without ordinary chemical union through complete enclosure of one set of molecules in a suitable structure formed by another", Powell, *J. Chem. Soc.* (London), vol. 61, 1948. Gas hydrates may thus be regarded as solid solutions in which the hydrate former solute is held in the lattice of the solvent water.

Hydrates have been studied extensively in petroleum gas processing and refining because precipitated hydrates in pipelines pose a problem. Hydrates have also been studied for potential industrial application to processes such as sea water desalination and solution concentration.

U.S. Pat. No. 2,904,511 to Donath describes a process for producing desalinated water by forming a hydrate with salt water, separating the hydrate from the residual concentrated solution and decomposing the hydrate to recover purified water.

U S. Pat. No. 3,415,747 to Glew describes the formation of hydrates at low pressure, separation of the hydrate from the residual concentrated solution, and decomposition of the hydrate as a method either of producing purified water or of recovering solutes from dilute aqueous solutions.

U.S. Pat. No. 4,253,948 to Hardman and Schwerko describes the use of liquid carbon dioxide for extraction of nonpolar solutes from aqueous solutions followed by separation of the carbon dioxide solvent from the raffinate and formation of carbon dioxide hydrate from the extracted water by cooling the extract. By this method the water content of the extract is reduced, although the loading of the carbon dioxide solvent with the product solute is not significantly altered.

U.S. Pat. No 4,147,456 to Klass relates to a process for storing fuel gas by pumping the gas into the lower portion of a storage vessel where a solid fuel gas hydrate can form due to the vessel being positioned beneath the surface of a body of water. The lower zone has a higher pressure relative to the atmosphere and this pressure can be sufficient to cause hydrate formation of the fuel gas and water. The lower pressure at an upper zone causes decomposition of the solid hydrate to fuel gas and water. Fuel gas for use is removed from the upper zone.

U.S. Pat. No. 4,007,787 to Cottle describes a process for recovering natural gas from gas hydrate reservoirs by passing light hydrocarbons which do not form hydrates through the formation to dissolve and recover natural gas.

While the use of hydrates has been studied with regard to the formation of hydrate crystals and the physical separation of crystals from the concentrated solution which results from their formation, the prior art does not disclose the use of an additional solvent or adsorbant phase to extract desired products from the concentrated aqueous phase, this extraction occurring while the residual aqueous solution is still in contact with the hydrate, and being enhanced by the increase in solute concentration caused by hydrate formation. In addition, the prior art does not disclose the use of a single material which serves simultaneously both as a hydrate former and as an extractant to extract solutes from the residual aqueous phase.

SUMMARY OF THE INVENTION

In the present invention, the use of hydrate formation enhances solvent extraction or adsorption by creating a higher solute concentration in the aqueous phase which drives the solute into the extractant phase (a liquid solvent extractant or solid adsorbant extractant). The process is particularly effective for dilute solutions and at low temperatures.

According to the present invention, there is provided a process for forming a purified solute from an aqueous mixture of water and solute. A mixture including a solvent or adsorbant extractant, a hydrate former, water, and the solute is formed. The hydrate former is selected to be capable of forming a hydrate with water at temperatures and pressures at which the solute does not form a hydrate. The hydrate former is present in an amount sufficient to permit hydrate formation with water in the aqueous mixture. When the hydrate former is also capable of acting as a solvent for the solute, the hydrant former may also serve as the extractant phase. The mixture is subjected to appropriate conditions of temperature and pressure to form (a) a solid water hydrate of the hydrate former as well as (b) a more concentrated water solution of the solute and (c) a separate extractant phase, into which some portion of the solute will partition. Some or all of the extractant phase is then removed from intimate contact with the other components of the mixture, and the solute is separated from the extractant to form a purified solute.

DETAILED DESCRIPTION OF THE INVENTION

The process of the present invention results in the production of a purified solute from an aqueous mixture of water and the solute. The preferred solutes are organic materials which are at least partially soluble in water. Typical solutes include alcohols, organic acids, vitamins, steroids, flavors, aromas, lipids, aldehydes, ketones, esters, proteins, peptides and amino acids. The solutes are, preferably, nonhydrate-forming at the conditions utilized in the present invention. Since temperatures employed in the process of the present invention are relatively low, it is contemplated that solutes that are degraded or altered by higher temperatures may be purified by the present invention.

The mixture of solute and water is typically an aqueous dispersion or solution. It is contemplated that concentrations far below the saturation level may be used. Typical concentrations of solute are on the order of one one-thousandth to one tenth part of solute per part by weight of water.

The mixture from which the solute is extracted can be, for example, a mixture produced by fermentation or biochemical processes, or the product of conventional chemical processes. The mixture can contain materials other than the solute and water. The extractant utilized in the present invention is compatible with the solute in that the extractant is capable of solubilizing, extracting, adsorbing or otherwise taking up the solute.

The hydrate former can be a supercritical fluid, near-critical liquid or conventional liquid. Supercritical fluids include gases at conditions above their critical temperatures and pressures. Near-critical liquids are volatile liquids near but below their critical temperatures and near their critical pressures. Typical supercritical or near-critical fluid extractants include: carbon dioxide, ethane, ethylene, refrigerant 22 ($CHClF_2$), refrigerant 23 ($CHF_3$), nitrous oxide, propane, mixtures of these compounds and mixtures of these compounds with other materials. Preferred supercritical or near-critical fluid extractants include: carbon dioxide, ethylene, propane and refrigerant 22 ($CHClF_2$).

The extractant can be a solvent of the types listed above, can be a non-hydrate forming conventional liquid solvent, can be a phase of an aqueous two-phase system or can be an adsorbant. Aqueous two-phase systems include polymer/polymer and polymer/salt immiscible systems in which each of the two phases is composed primarily of water, and in which the two aqueous phases have different affinities for solutes such as proteins, peptides and nucleic acids and for cells. Adsorbants include solid supports with surfaces bearing charged groups, affinity ligands, hydrophobic groups or other chemical moieties capable of binding, retaining or adsorbing solutes of interest. The extractant can be kept separate from the concentrated aqueous phase from which the solute is removed by a porous membrane through which the solute can pass. Such an arrangement facilitates recovery of the extractant from the mixture of hydrate, hydrate former and concentrated aqueous solution.

The hydrate of the hydrate former and water is formed by subjecting the mixture of extractant, hydrate former, water and solute to suitable temperatures and pressures. The extractant and hydrate former can be the same material. Typically, the temperature employed is from about $-15°$ C. to about $30°$ C. with temperatures on the order of $4°$ to $12°$ C. being preferred. Higher temperatures can increase cooling energy consumption. Typically, the pressures employed are from about 0.2 bar to about 400 bar with pressures on the order of 150 bar being preferred for supercritical fluid hydrate formers, 50 bar being preferred for near-critical liquids, and one bar being preferred for conventional liquids. Higher pressures may result in excessive equipment costs and/or pumping energy expenses. Lower pressures can give poor solvent power of the extractant and/or poor hydrate formation.

During the formation of the hydrate, the amount of water in non-hydrate form decreases and hence the concentration of the solute in the remaining water increases. This increased aqueous concentration gives rise to a higher solute concentration in the extractant. Preferably, about one-tenth part to ten parts by weight of the extractant are utilized per part of water. The mixture may be agitated to increase the rates of hydrate formation and mass transfer, and heat may be removed from the mixture by a flow of cooling liquid, use of refrigeration coils or jacket, or other means. The extractant and hydrate former may be run continuously through the vessel in which hydrate formation occurs, or may be added as a single charge. At least some part of the extractant loaded with the solute is removed from intimate contact with the hydrate to allow recovery of solute from the extractant.

The solute is then separated from the extractant according to procedures which are known in the prior art. In the case of a supercritical fluid extractant, the solute may be caused to precipitate from the extractant by lowering the pressure and/or changing the temperature. Solute may be recovered from near-critical or conventional liquid solvents by increasing the temperature and/or reducing the pressure to boil the liquid into vapor, leaving the solute behind, or by extracting the solute into another liquid. The solute can alternatively be recovered from the solvent by distilling the solute out of the solvent, or by precipitating the solute from the solvent in the form of a separate liquid or solid phase, or by adsorbing the solute onto a suitable adsorbant. In the case of solid adsorbant extractants, the solute can be recovered by elution of the solute by changes in temperature, pH, or ionic strength, or by addition of specific eluants.

The following examples illustrate the present invention and are not intended to limit the same.

The apparatus used to perform Examples 1 through 3 was as follows: An Autoclave Engineers stirred high-pressure vessel of about 1 liter internal volume was insulated with a layer of fiberglass insulation and aluminum foil wrapped around the outside of the vessel. Chilled water was circulated through the internal cooling coil to maintain an internal temperature below ambient. A dip tube was used to sample the liquid contents of the vessel. Samples could be taken only in the absence of extensive hydrate formation, which led to plugging of the sampling tube. A port on the headplate of the vessel was used to withdraw samples of the solvent phase into a jacketed line leading to a flashing valve. Chilled water was circulated in the jacket around the sampling line to avoid any changes in the temperature of the upper-phase samples as they passed through the sampling line. The upper phase was sampled by cracking the flashing valve to allow some of the solvent to flash to ambient pressure. Extracted materials were precipitated as the pressure was reduced, and were collected in glass U-tubes packed with glass wool to prevent any entrainment of droplets of the extract. The U-tubes were weighed to within 1 miligram before and after collection of the extract, and 2 U-tubes were used in series to control for incomplete collection of the extract in the first U-tube. The weight of extract collected in the second U-tube was normally less than 2% of the weight collected in the first U-tube. The flashing valve was heated to avoid freezing. After flashing of the solvent and collection of the extract, the solvent gas was passed through a rotameter to allow monitoring of the instantaneous gas flow rate, and through a dry test meter to allow integration of the total amount of solvent gas flowed in a given sampling run. The upper-phase composition in the vessel could be calculated from the weight and composition of the extract, and the volume of gas (at the known temperature and pressure of the dry test meter) which was associated with that amount of extract. The sampling technique is similar to that described by Kurnik et al., *Fluid Phase Equilibria* 8:93–105 (1982) for determination of solubilities of solids in supercritical solvents.

That a hydrate had begun to form in the apparatus was confirmed in several ways. When the hydrate was formed by steady cooling of the high-pressure vessel at a constant pressure of the hydrate-forming gas, the temperature would cease to drop and would remain constant as the hydrate was formed, liberating the heat of formation of the hydrate. Another test involved the use of a non-extractable second solute in the water phase, which would be expected to be concentrated as the hydrate formed. Phenylalanine at a concentration of 1-2 g/l was chosen as the tracer solute, as its concentration could be conveniently determined by measuring the absorbance of samples in the ultraviolet region around 257 nm in wavelength. The use of the tracer solute allowed confirmation of concentration of the aqueous phase by a factor of at least 1.5, but reliable liquid samples could not be obtained at higher concentration factors.

The final test for hydrate formation at conditions of interest was the use of preliminary experiments in a small high-pressure sight flow indicator for direct visual confirmation of hydrate formation. In this way it could be established visually that hydrate would form at conditions of interest before going to the autoclave.

EXAMPLE I

Use of Ethylene as Hydrate Former and as Extractant

A mixture of water and two weight percent butanol is stirred by ethylene at 12° C. and at a pressure of about 65 bar. The ethylene forms a hydrate with water to produce a more concentrated aqueous solution of water and butanol. As the concentration of butanol in the aqueous phase in increased, more butanol partitions into the ethylene. The concentration of butanol in the ethylene phase is measured by the flashing and extract collection technique described above. The butanol concentration in the ethylene phase is originally about 0.082 percent by weight after the vapor and liquid phases have been mixed to equilibrium, but before the onset of hydrate formation. As the hydrate forms, the concentration of butanol in the ethylene phase rises to 0.15 weight percent at 30 minutes, to 0.60 weight percent after about 90 minutes, and by about 3 hours has reached its final value of about 0.075 percent by weight.

The extracted material, recovered after reducing the pressure of the ethylene, was about 93 weight percent butanol before the hydrate had formed, and greater than 97 percent butanol by weight after the hydrate had formed.

EXAMPLE II

Effects of Salts

A mixture of water and two weight percent butanol containing 10 g/l sodium phosphate is mixed with ethylene at 12° C. and at about 65 bar. The ethylene forms a hydrate with water to produce a more concentrated aqueous solution of water and butanol. As the concentration of butanol in the aqueous phase is increased, more butanol partitions into the ethylene. The concentration of butanol in the ethylene phase is measured by the flashing and extract collection technique described above. The butanol concentration is originally about 0.1 percent by weight after the vapor and liquid phases have been mixed to equilibrium, but before the onset of hydrate formation. As the hydrate forms, the concentration of butanol in the ethylene phase rises steadily, reaching about 0.35 weight percent by 90 minutes and reaching a final value of about 0.7 weight percent.

The effect of the salt was to increase slightly the initial partitioning of the butanol into the ethylene phase. The formation of hydrate was not significantly affected. This amount of salt is comparable to that found in typical fermentation broths.

EXAMPLE III

Use of Carbon Dioxide as Extractant and as Hydrate Former

A mixture of water and 4 weight percent acrylic acid is mixed with liquid carbon dioxide at about 4° C. and about 55 bar. The carbon dioxide forms a hydrate with water to produce a more concentrated aqueous solution of water and acrylic acid. As the concentration of acrylic acid in the aqueous phase is increased, more of the acid partitions into the carbon dioxide phase. The concentration of acrylic acid in the carbon dioxide phase is measured by the flashing and extract collection technique described above. The acrylic acid concentration is originally about 0.6 weight percent after the vapor and liquid phases have been mixed to equilibrium, but before the onset of hydrate formation. As the hydrate forms, the concentration rises to an equilibrium value of about 1.1 weight percent after about 4 hours.

The following examples were performed using refrigerant 11 ($CCl_3F$) as the extractant and hydrate former in an enclosure maintained at a temperature of 4° C., using ordinary laboratory vessels. Formation of hydrate could be observed directly. The method of determining the composition of the solvent phase involved back-extraction of solutes into water, evaporation of the volatile solvent and analysis by liquid chromatography, as described below.

Four-milliliter samples of the solvent-rich bottom phase were removed and placed in a loosely covered sampling vial containing 4 mls of water. The vial was shaken to extract the solute from the organic phase into the water phase, then placed in a bath at about 45° C. until the solvent had evaporated. The amount of solute contained in the original solvent sample was determined by analyzing the solvent-free solution by HPLC.

EXAMPLE IV

Use of Refrigerant 11 with Modifier

About 109 grams of refrigerant 11 containing about 0.09 weight percent trioctyl phosphine oxide (a modifier added to increase the solvent power) is shaken at 4° C. with about 20 grams of a 25 g/l solution of propionic acid in water. At various times, samples of the refrigerant 11 phase are withdrawn and analyzed as described above. The concentration of propionic acid partioned into the refrigerant 11 phase increases, reaching 0.71 g/l after 90 minutes and 1.1 g/l at 2.5 hrs. After equilibration overnight, the concentration of propionic acid is constant at about 1.7 g/l. After hydrate formation, the original water phase is in the form of a slurry of small, sticky crystals from which aqueous-phase samples can not be obtained.

EXAMPLE V

Extraction of Butanol with Refrigerant 11

About 135 grams of refrigerant 11 at about 4° C. are shaken with about 14 grams of a 10 g/l solution of butanol in water. At various times, samples of the refreigerant 11 phase are withdrawn and analyzed as described above. The concentration of butanol in this phase is originally about 1.0 g/l. As hydrate slowly forms in the flask, the concentration of butanol partitioned into the refrigerant 11 phase increases, reaching 1.18 g/l after 10 minutes and 1.48 g/l at 30 minutes. After equilibration overnight, the concentration of butanol is constant at about 2.1 g/l.

We claim:

1. A process for forming a purified solute from an aqueous mixture containing water and a solute comprising forming a mixture of an extractant, a hydrate former and said aqueous mixture, said hydrate former being capable of forming a hydrate with water at temperatures and pressures at which said solute does not form a hydrate, said hydrate former being present in an amount sufficient to permit hydrate formation with water in said aqueous mixture, said extractant being a solvent or adsorbant capable of taking up significant amounts of the solute from water, subjecting said mixture to conditions of temperature and pressure to form a hydrate of said hydrate former with water thereby forming a second mixture comprising a solid portion consisting of water hydrate of said hydrate former, a liquid portion comprising a water solution of said solute, a portion comprising hydrate former and a portion comprising extractant containing concentrated amounts of solute, removing at least some of said extractant portion from said solid portion and said liquid portion and separating said solute from said extractant to form a purified solute.

2. A process for forming a purified solute from a water and solute mixture according to claim 1 wherein said hydrate former comprises a hydrate-forming hydrocarbon.

3. A process for forming a purified solute from an aqueous water and solute mixture according to claim 2 wherein said hydrate former comprises a hydrate forming hydrocarbon selected from the group consisting of ethane, ethylene and propane.

4. A process for forming a purified solute from a water and solute mixture according to claim 1 wherein said hydrate former comprises a hydrate-forming halogenated hydrocarbon.

5. A process for forming a purified solute from an aqueous water and solute mixture according to claim 4 wherein said hydrate former comprises a hydrate-forming halogenated hydrocarbon selected from the group consisting of $CCl_3F$, $CCl_2F_2$, $CHF_3$, $CH_3CHF_2$, methyl bromide, methyl chloride and ethyl chloride.

6. A process for forming a purified solute from a water and solute mixture according to claim 1 wherein said hydrate former comprises carbon dioxide.

7. A process for forming a purified solute from a water and solute mixture according to claim 1 wherein said hydrate former comprises nitrous oxide.

8. A process for forming a purified solute from a water and solute mixture according to claim 1 wherein said extractant is the same material as the hydrate former.

9. A process for forming a purified solute from a water and solute mixture according to claim 1 wherein said extractant comprises a liquid solvent selected from the group consisting of ethers, ketones, esters, alcohols, hydrocarbons and halogenated hydrocarbons and mixtures thereof.

10. A process for forming a purified solute from a water and solute mixture according to claim 1 wherein said extractant is a mixture of the hydrate former with other compounds.

11. A process for forming a purified solute from a water and solute mixture according to claim 1 wherein said extractant is an aqueous phase formed from the original aqueous solution by the addition of salts or polymers.

12. A process for forming a purified solute from a water and solute mixture according to claim 1 wherein said extractant is an aqueous phase formed from the original aqueous solution by the addition of a phosphate, dextran or polyethylene glycol.

13. A process for forming a purified solute from a water and solute mixture according to claim 1 wherein said extractant is a solid adsorbant.

14. A process for forming a purified solute from a water and solute mixture according to claim 13 wherein said extractant is a solid adsorbant having ion-exchange groups on its surface.

15. A process for forming a purified solute from a water and solute mixture according to claim 13 wherein said extractant is a solid adsorbant having hydrophobic groups on its surface.

16. A process for forming a purified solute from a water and solute mixture according to claim 13 wherein said extractant is a solid adsorbant having proteinaceous adsorbant groups on its surface.

17. A process for forming a purified solute from an aqueous water and solute mixture according to claim 13 wherein said solute comprises a ketone.

18. A process for forming a purified solute from an aqueous water and solute mixture according to claim 13 wherein said solute comprises a protein.

19. A process for forming a purified solute from a water and solute mixture according to claim 1 wherein said extractant is kept separate from the hydrate by a permeable barrier.

20. A process for forming a purified solute from a water and solute mixture according to claim 1 wherein said extractant contains compounds which react with the solute to enhance the extraction.

21. A process for forming a purified solute from an aqueous water and solute mixture according to claim 1 wherein said temperatures are from about $-5°$ C. to about $25°$ C.

22. A process for forming a purified solute from an aqueous water and solute mixture according to claim 1 wherein said pressures are from about 0.1 bar to about 500 bar.

23. A process for forming a purified solute from an aqueous water and solute mixture according to claim 1 wherein said extractant portion consists essentially of said extractant having solute dissolved therein or adsorbed thereon.

24. A process for forming a purified solute from an aqueous water and solute mixture according to claim 1 wherein said solid portion consists essentially of a water hydrate of said hydrate former.

25. A process for forming a purified solute from an aqueous water and solute mixture according to claim 1 wherein said solid portion is separated from said extractant portion by settling, centrifugation or filtration.

26. A process for forming a purified solute from an aqueous water and solute mixture according to claim 1 wherein said solute is separated from said extractant by distillation, back-extraction or adsorption.

27. A process for forming a purified solute from an aqueous water and solute mixture according to claim 1 wherein said solute is separated from said extractant by precipitation, condensation or crystallization.

28. A process for forming a purified solute from an aqueous water and solute mixture according to claim 1 wherein said solute is separated from said extractant by changing pH, temperature or ionic strength.

29. A process for forming a purified solute from an aqueous water and solute mixture according to claim 1 wherein said solute is separated from said extractant by addition of a material which displaces the solute from the extractant.

30. A process for forming a purified solute from an aqueous water and solute mixture according to claim 1 wherein said solute is separated from said extractant by reaction to form a new compound.

31. A process for forming a purified solute from an aqueous water and solute mixture according to claim 1 wherein said solute comprises an organic compound being at least partially soluble in water.

32. A process for forming a purified solute from an aqueous water and solute mixture according to claim 1 wherein said solute comprises an alcohol.

33. A process for forming a purified solute from an aqueous water and solute mixture according to claim 1 wherein said solute comprises an acid.

34. A process for forming a purified solute from an aqueous water and solute mixture according to claim 1 wherein said solute comprises an ester.

35. A process for forming a purified solute from an aqueous water and solute mixture according to claim 1 wherein said solute comprises an organic compound selected from the group consisting of ethanol, propanol, butanol, acetic acid, butyric acid, acrylic acid, methyl isobutyl ketone, ethyl butyrate, indigo, naphthoquinone, chloramphenicol, acetone, caffeine, vitamin E, beta-carotene, immunoglobulins, interferon and albumin.

* * * * *